F. HOWLES.
APPARATUS FOR SPREADING OR DISTRIBUTING POWDER INSECTICIDES UPON TREES, PLANTS, AND THE LIKE.
APPLICATION FILED DEC. 27, 1921.

1,411,498.

Patented Apr. 4, 1922.
4 SHEETS—SHEET 2.

Inventor
F. Howles,
By Marks & Clerk
Attys.

UNITED STATES PATENT OFFICE.

FRED HOWLES, OF MANCHESTER, ENGLAND.

APPARATUS FOR SPREADING OR DISTRIBUTING POWDER INSECTICIDES UPON TREES, PLANTS, AND THE LIKE.

1,411,498.  Specification of Letters Patent.  Patented Apr. 4, 1922.

Application filed December 27, 1921. Serial No. 525,164.

*To all whom it may concern:*

Be it known that I, FRED HOWLES, a subject of the King of Great Britain and Ireland, and resident of Glenluce, Water Park Road, Broughton Park, Manchester, England, have invented certain new and useful Improvements in Apparatus for Spreading or Distributing Powder Insecticides Upon Trees, Plants, and the like, of which the following is a specification.

This invention relates to apparatus for spreading or distributing insecticides in powder form upon trees, plants and the like, of the type in which the powder is delivered by means of air currents, and has for its object to provide an improved arrangement of apparatus in which the rate of delivery of the powder is proportioned to the quantity of air passing through the apparatus and in which several spreading pipes or nozzles can be utilized and a uniform delivery of powder be ensured from the whole of the said nozzles.

My invention comprises the combination with a powder container having a series of holes in the bottom thereof, said holes delivering the powder into ducts through which air is passed to carry the powder to the distributing nozzles, of a vane or like wheel rotating over the bottom of the vessel so as to facilitate a delivery of powder to the said ducts through the holes in proportion to the rate of rotation of the vane wheel.

My invention further comprises the arrangement in the combination aforesaid, of independent control valves for regulating the delivery of powder to the ducts and the flow of air therethrough.

Referring to the accompanying sheets of explanatory drawings:—

The same reference letters in the five figures indicate the same parts.

Figure 1:
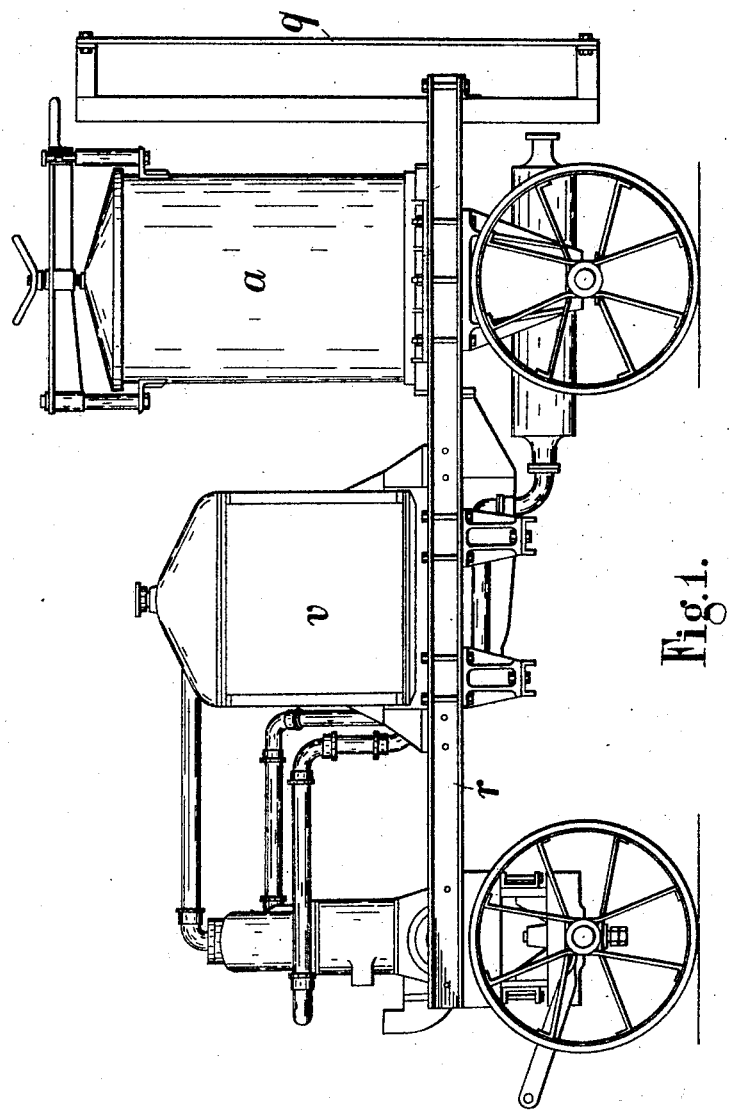
Figure 1 is a side elevation, Figure 2 an end elevation and Figure 3 a plan view of a powder spreading or distributing machine constructed in one convenient form in accordance with my invention.
Figure 2:
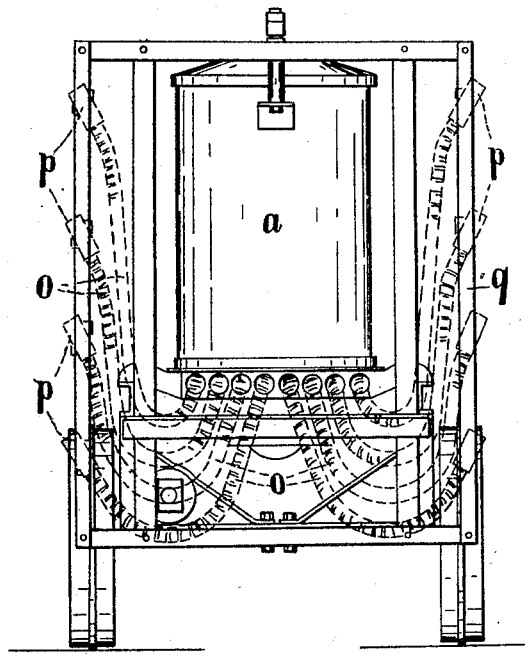
Figure 3:
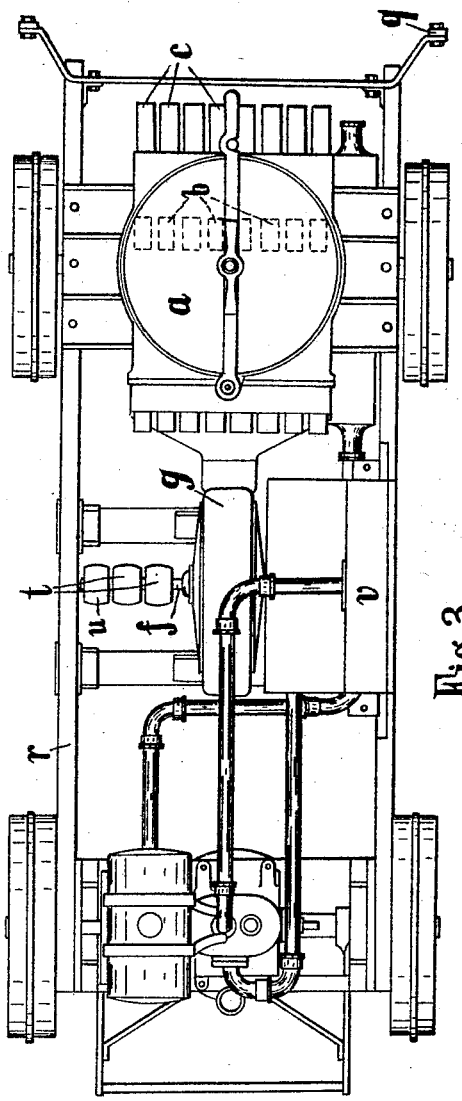
Figure 4:
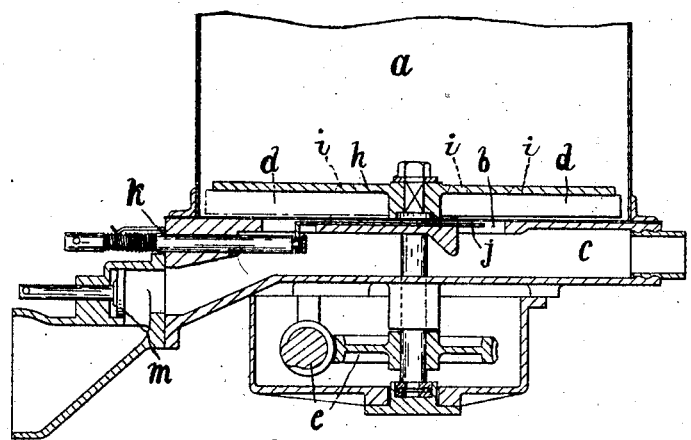
Figure 4 is a sectional elevation of the means for delivering the powder to the ducts and so to the spreading nozzles.
Figure 5:
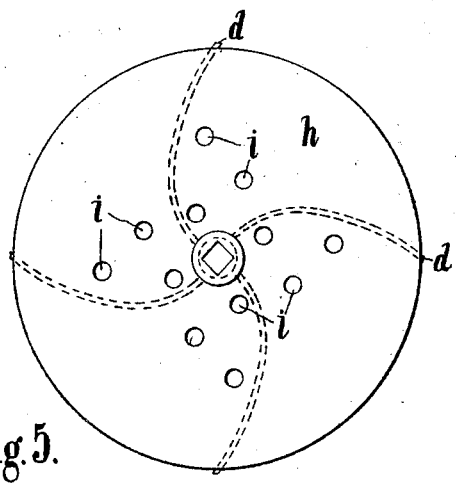
Figure 5 is a plan view of the rotating vane wheel.

In accordance with my invention, the powder container $a$ has a series of holes $b$ in the bottom plate thereof, each hole serving to deliver powder from the container into a separate channel or duct $c$ through which air passes to a spreading nozzle. The delivery of powder through the said holes is facilitated by a vane wheel or the like $d$ which is positively rotated by a worm and worm wheel $e$ (see Figure 4) and a belt from the shaft $f$ of the fan $g$ which provides the air blast for spreading the powder. The vanes of the vane wheel sweep the powder over the holes and so cause a delivery to each duct to the air ducts $c$, the rate of delivery to each duct being controlled by a valve plate $j$ adjustable by a screw $k$. The vane wheel has rigidly combined therewith a disc $h$ with holes $i$ therein which regulate the rate of flow to the holes $b$, the said disc supporting the weight of the powder in the container. The rate of flow of air into each duct $c$ is controlled by a plate $m$.

The ducts $c$ lead to flexible pipes $o$ fitted with spraying heads or nozzles $p$ which are secured to the frames $q$ issuing from the heads. When a large volume of powder is to be sprayed in one direction, I may provide a single spraying head which receives the powder from all the ducts $c$.

The fan $g$, powder container $a$, an engine $n$ for driving the fan and the vane wheel $d$ and the spreading nozzles $p$ may be mounted on a truck or trolley $r$ so that by drawing the latter between two rows of trees or plants the nozzles will direct the powder in the required directions for the most efficient service. The nozzles are preferably so mounted in position that they do not require any manipulation while the truck or trolley is being drawn along adjacent the trees or plants to be sprayed.

The engine may drive the fan shaft throug a belt and fast and loose pulleys $t, t$ a further fast pulley $u$ being provided upon said shaft for driving the worm shaft of the vane wheel drive through a belt. The fan $g$ also serves for drawing air through the radiator $v$ by which the cooling of the engine circulating water is effected.

I do not limit myself to any particular arrangement or shape of vane wheel for delivering the power to the spreading pipes or ducts $c$ but may modify or vary the same to suit any particular services or requirements.

I claim:—

1. In apparatus for spreading or distributing powder insecticide upon trees, plants and the like, in combination, a powder container having a series of holes in the bottom thereof, a plurality of independent ducts beneath said container each communicating with the interior of the latter through a hole in the bottom, means delivering air through the ducts and a vane wheel rotating over the bottom of the container to facilitate a delivery of powder to said ducts through the holes, as set forth.

2. In apparatus as claimed in claim 1, the combination with the vane wheel of a disc disposed above and rotating with said wheel, and having holes therein to regulate the supply of powder to the holes in the container bottom, as set forth.

3. In apparatus as claimed in claim 1, independent control valves for regulating the holes in the container bottom for adjusting the rate of delivery of powder therethrough, as set forth.

4. In apparatus as claimed in claim 1, independent control valves for regulating the ducts through which air is passed, as set forth.

In testimony whereof I have signed my name to this specification.

FRED HOWLES.